US005672301A

United States Patent [19]
Orly et al.

[11] Patent Number: 5,672,301
[45] Date of Patent: Sep. 30, 1997

[54] METHOD FOR FABRICATING MICROPARTICLES IN EMULSION BY MODIFICATION OF THE CHEMICAL COMPOSITION OF THE DISPERSED PHASE AFTER EMULSIFICATION

[75] Inventors: Isabelle Orly, Lyons; Marie-Christine Levy, Reims; Eric Perrier, Vienne, all of France

[73] Assignee: Coletica, Lyons, France

[21] Appl. No.: 387,774

[22] PCT Filed: Aug. 4, 1993

[86] PCT No.: PCT/FR93/00791

§ 371 Date: Feb. 21, 1995

§ 102(e) Date: Feb. 21, 1995

[87] PCT Pub. No.: WO94/04260

PCT Pub. Date: Mar. 3, 1994

[30] Foreign Application Priority Data

Aug. 20, 1992 [FR] France .................................. 92 10174

[51] Int. Cl.$^6$ .................................................... B01J 13/02
[52] U.S. Cl. .................. 264/4.1; 264/4.3; 264/4.7; 427/213.3; 427/213.31; 427/213.32; 427/213.33; 427/213.34; 427/213.35
[58] Field of Search ............................. 264/4.1, 4.3, 4.7; 427/213.3, 213.31, 213.32, 213.33, 213.34, 213.35

[56] References Cited

U.S. PATENT DOCUMENTS

| | | | |
|---|---|---|---|
| 3,833,744 | 9/1974 | Bomstein | 426/212 |
| 4,187,194 | 2/1980 | Wellman et al. | 252/316 |
| 4,217,370 | 8/1980 | Rawlings et al. | 426/98 |
| 4,497,793 | 2/1985 | Simkin | 424/32 |
| 4,814,176 | 3/1989 | Makino et al. | 424/457 |
| 5,051,304 | 9/1991 | David et al. | 428/402.2 |
| 5,227,274 | 7/1993 | Ishikawa et al. | 430/138 |
| 5,362,424 | 11/1994 | Lee et al. | 264/4.3 |

FOREIGN PATENT DOCUMENTS 0 273 823  7/1988  European Pat. Off. .

Primary Examiner—Nathan M. Nutter
Attorney, Agent, or Firm—Millen, White, Zelano, & Branigan, P.C.

[57] ABSTRACT

The method for producing microparticles is characterized in that it comprises the following steps: preparation of an emulsion of a solution of a substance or a mixture of substances in a dispersing liquid wherein said substance or said mixture are substantially insoluble; incorporating to said dispersed phase a chemical agent substantially insoluble in the dispersing liquid so as to cause within the dispersed phase a chemical or physicochemical reaction responsible for the formation of microparticles which are then isolated.

72 Claims, No Drawings

METHOD FOR FABRICATING MICROPARTICLES IN EMULSION BY MODIFICATION OF THE CHEMICAL COMPOSITION OF THE DISPERSED PHASE AFTER EMULSIFICATION

The present invention relates essentially to a process for the manufacture of microparticles in emulsion by modification of the chemical composition of the disperse phase after emulsification. Advantageously, these microparticles are manufactured by a chemical or physicochemical reaction within the disperse phase of an emulsion of a substance or mixture of substances by modification of the chemical composition of the disperse phase after emulsification, said reaction being caused by the incorporation of a chemical which is essentially insoluble in the dispersing liquid.

The formation of microparticles by a chemical reaction is known for example from the documents FR-A-2 444 497 Mars, FR-A-2 527 438 CNRS or else 89 01221 BIOETICA, which describe the preparation of microcapsules by the interfacial crosslinking of an aqueous solution of a protein or a protein/polysaccharide mixture within a hydrophobic phase using a difunctional agent such as an acid dichloride.

It is also known to manufacture microparticles from solutions of polymers by physicochemical modifications, but these processes are so-called simple or complex coacervation processes (for example the document EP 0 273 823 A1 MERO ROUSSELOT SATIA), according to whether one or two types of polymers are involved. In said document, the coacervation reaction takes place in the continuous phase, resulting in the formation of a membrane which deposits on the droplets of the dispersed hydrophobic liquid or on the particles of the dispersed solid. The process described in said document is furthermore limited to the encapsulation of a hydrophobic liquid or a solid, the encapsulation of an aqueous phase being impossible.

The document U.S. Pat. No. 4,217,370 RAWLINGS describes a process for the trapping of lipidic microdroplets dispersed in a continuous phase based on a protein substance, which is precipitated by modification of the pH. This process thus consists in trapping droplets in a rigidified matrix by precipitation of the continuous phase.

The document U.S. Pat. No. 4,187,194 WELLMAN describes a process for encapsulation by solvent evaporation.

The document U.S. Pat. No. 4,497,593 SIMKIN relates to a conventional interfacial crosslinking process in which no chemical modification is carried out within the disperse phase.

The present invention makes it possible to manufacture microparticles by a different method from the conventional interfacial crosslinking or simple and complex coacervation methods.

The object of the present invention is to manufacture microparticles, in particular microcapsules, by an extremely simple and inexpensive manufacturing process which has a good reproducibility and hence a good reliability, which makes it possible to adjust the size of the particles obtained within a wide range of values, and which, in particular, affords the possibility of avoiding the use of difunctional crosslinking agents whose residual presence or whose reaction products are liable to jeopardize the biocompatibility of the microparticles or microcapsules formed in this way, thereby making said process very competitive on the industrial scale and preferentially suitable for use in cosmetics or pharmaceuticals or else foodstuffs. The object of the invention is to modify the chemical or physicochemical composition of the disperse phase in order to manufacture microparticles, in particular microcapsules.

The present invention makes it possible to meet these demands simultaneously.

Thus the present invention provides a process for the manufacture of microparticles, in particular microcapsules, characterized in that an essentially homogeneous solution of a substance or mixture of substances in a solvent is first prepared, an emulsion of the solution is produced in a dispersing liquid forming a continuous phase, in which said substance or said mixture is essentially insoluble, and forming a disperse phase, and a chemical or physicochemical reaction is then initiated in the disperse phase by modification of the in situ chemical composition of said substance or said mixture in the disperse phase through the addition of an agent which is essentially insoluble in or immiscible with the continuous phase, under the conditions of addition, thereby modifying the physicochemical state and resulting in the insolubilization of the substance or mixture of substances and the individualization of said microparticles, which are then recovered.

The subject of the present invention is based essentially on the possibility, wholly novel to those skilled in the art, of being able to modify the chemical composition of the disperse phase of an emulsion after the dispersion has been produced, using agents which are insoluble in or immiscible with the continuous phase.

In one advantageous variant, the agent which is essentially insoluble in or immiscible with the continuous phase, under the conditions of addition, and which it is desired to incorporate into the disperse phase is present as a solution in a solvent which is miscible with the solvent of the disperse phase and which has a lower affinity for the dispersing liquid of the continuous phase than for the disperse phase.

In one particular application, this operation makes it possible, totally unexpectedly, to diffuse the reaction-initiating agent through a hydrophobic phase and into the droplets of a dispersed aqueous solution, whereas an aqueous solution of the same agent is completely ineffective.

As the substance or mixture of substances used to produce the solution, it is preferable to choose proteins, polysaccharides or nucleic acids, mixtures of proteins, mixtures of polysaccharides or mixtures of proteins and polysaccharides, optionally with nucleic acids.

Proteins which may be mentioned are the following purified proteins: alpha-lactalbumin, beta-lactoglobulin, caseins, ovalbumin, animal albumins, blood globulins, hemoglobin, fibrinogen, collagen, atelocollagen, gelatin, keratin, vegetable albumins, vegetable globulins, glutenins and gliadin, and protein extracts derived from milk, silk, cereals, leguminous plants, algae and fish.

Polysaccharides which may be mentioned are agar, agarose, agaropectin, carrageenans, alginates, pectins, amylose, amylopectin, starch, modified starches, galactomannans (guar, carob), glucomannan, konjac, modified celluloses, inulin, xanthan, dextran, curdlan, gellan, chitosan, chondroitin sulfates, hyaluronic acid, dermatan sulfate, heparan sulfate, heparin and keratan sulfate.

Ribonucleic acid and deoxyribonucleic acid are envisaged as the nucleic acids.

The formation of covalent bonds, in particular esterifications and amidations, or the formation of ionic bonds between the ionizable groups of a substance or mixture of substances is envisaged as the chemical reaction.

A physicochemical reaction is understood essentially as meaning reactions such as coacervation, precipitation or desolvation reactions.

In another advantageous variant of the process, the latter is characterized in that the abovementioned agent which is essentially insoluble in or immiscible with the continuous phase causes a phase separation within the initially homogeneous solution of the disperse phase, the gelling of said solution of the disperse phase or a loss of solubility of the disperse phase by condensation or polymerization.

In another advantageous variant of the process, the abovementioned agent which is essentially insoluble in or immiscible with the continuous phase, under the conditions of addition, is a non-solvent for the substance or mixture of substances solubilized in the solvent of the disperse phase, or said agent causes a pH modification, or said agent comprises at least one electrolyte, or said agent comprises at least one molecule capable of reacting with the substance or substances dissolved in the disperse phase of the emulsion.

In yet another advantageous variant, the abovementioned non-solvent for the substance or mixture of substances solubilized in the solvent of the disperse phase, which is essentially immiscible with the continuous phase under the conditions of addition, causes insolubilization of the disperse phase, in particular gelling or coagulation.

In yet another particular variant, the abovementioned non-solvent is selected from an alcohol, in particular a $C_1$–$C_6$ lower alcohol, preferably ethyl alcohol, or a ketone, in particular a $C_2$–$C_6$ lower ketone, preferably acetone.

In a first advantageous embodiment, the following successive steps are performed:

a) an aqueous solution of a substance selected from nucleic acids, a protein or a polysaccharide, or various mixtures of these substances, is prepared;

b) a hydrophobic liquid is provided in which the abovementioned substance or substances are essentially insoluble;

c) the hydrophobic liquid and the aqueous phase are mixed to form an emulsion in which the aqueous solution is the disperse phase and the hydrophobic liquid is the continuous phase;

d) the non-solvent for the substance solubilized in the disperse phase is added to the emulsion in proportions such that said non-solvent is essentially immiscible with the continuous phase, thereby forming microparticles by gelling or coagulation;

e) the microparticles formed by said gelling or said coagulation are collected by physical separation means, for example by filtration, centrifugation or decantation; and f) the cohesion of the microparticles is preferably strengthened by crosslinking.

In a second advantageous embodiment, the first step is to produce an emulsion of an aqueous solution of a substance or mixture of substances capable of undergoing, by a chemical or physicochemical reaction, a variation in physicochemical state represented by insolubilization caused by a pH modification, at a pH at which the physicochemical state of said substance or said mixture of substances is that of a solution whose viscosity is appropriate for the production of an emulsion; the pH is then varied by the addition of the abovementioned insoluble or immiscible agent, comprising a pH-modifying substance dissolved in an organic solvent miscible with the aqueous phase, in order to initiate the chemical or physicochemical reaction and bring the substance or mixture of substances into a physicochemical state which corresponds to insolubilization of the substance or mixture and which results in the formation of physically individualized microparticles.

The pH-modifying substance used is generally an acid, a base or a buffer, depending on the desired pH value.

According to one advantageous characteristic of the processes according to the invention, the substance used if it is desired to render the disperse phase of the emulsion alkaline is a solution of sodium hydroxide or potassium hydroxide in an alcohol such as methanol or ethanol, used pure or containing 5 to 10% (w/v) of water, or else a polyol such as glycerol or a polyethylene glycol. According to a preferred characteristic, the solution contains between 0.5 and 10% of sodium hydroxide in 95% (w/v) ethanol.

According to another advantageous characteristic of the processes according to the invention, the substance used if it is desired to acidify the disperse phase of the emulsion is a solution of a monocarboxylic or polycarboxylic acid which may or may not carry alcohol groups, such as acetic acid, citric acid, lactic acid, tartaric acid, succinic acid or malic acid, or a mineral acid such as hydrochloric acid, in an alcohol such as methanol or ethanol, used pure or containing 5 to 10% of water, or else in a polyol such as glycerol or a polyethylene glycol. According to a preferred characteristic, the acid solution consists of 95% ethanol containing between 1 and 10% (v/v) of acetic acid.

According to another feature, the reaction caused in situ by the change of pH in the droplets of the disperse phase is a physicochemical coacervation reaction.

In this case, the process for the manufacture of the microparticles is advantageously as follows:

a) an aqueous solution of a substance selected from nucleic acids, a polysaccharide or a protein, or various mixtures of these substances, is prepared, the pH being chosen so that the substance or mixture of substances forms an essentially homogeneous solution whose viscosity is compatible with the production of an emulsion;

b) a hydrophobic liquid is provided in which the abovementioned substance or substances are essentially insoluble;

c) the hydrophobic liquid and the aqueous phase are mixed to form an emulsion;

d) either a solution of an alkaline substance in an organic liquid miscible with the aqueous phase is added to the emulsion, if it is desired to render the aqueous phase alkaline, or a solution of an acid substance in an organic liquid miscible with the aqueous phase is added to the emulsion, if it is desired to acidify the aqueous phase;

e) after a predetermined period of time required to effect the coacervation of the initially solubilized substance or substances, the microparticles formed are collected by centrifugation or filtration; and f) the cohesion of the microparticles is preferably strengthened by crosslinking, crosslinking being preferred in the majority of cases.

A number of reagents may be mentioned as examples of agents—conventional to those skilled in the art—for crosslinking polyamino, polycarboxylic or polyhydroxylic compounds or compounds having a mixture of these types of groups; said reagents can be separated into two types.

The first type consists of difunctional agents which form a bridge between the reactive groups of the substance or substances constituting the microparticles, and remain in the reaction product. Formaldehyde, glutaraldehyde and dialdehydes in general, acid dichlorides, acid dianhydrides, diisocyanates, diimidoesters, bischloroformates and succinimides belong to reagents of this type.

The second type of reagent is made up of agents which do not form a bridge but which activate the carboxyl groups, in particular, so that they can form amide bonds with the amino groups or ester bonds with the alcohol groups of the substance or mixture of substances used to manufacture the microparticles. The azide methods such as described in the documents EP-A-0301977 BIOETICA and WO 90/12055 BIOETICA, or the methods using carbodiimides, for example, are representative of this type of method.

In the case where it is desired to prepare microparticles of perfect biocompatibility, which is absolutely essential for use in pharmaceuticals, it will be particularly preferable to use methods of the second type, which, by permitting the formation of amide or ester bonds directly between on the one hand the carboxyl groups and on the other hand the amino or alcohol groups of the substance or substances constituting the microparticles, make it possible quite remarkably to obtain microparticles consisting solely of the substance or substances used to produce the emulsion, to the exclusion of any crosslinking agent.

In one particular variant, the protein used is collagen; in fact, this protein is essentially soluble at a pH below 4 and precipitates at pH values above 4. A collagen solution is therefore manufactured at a pH of about 3.5. An emulsion is produced by dispersion of the collagen solution in a hydrophobic liquid. The droplets of the collagen solution are rendered alkaline by the addition of an alkaline alcoholic solution to the emulsion, causing precipitation of the collagen and hence individualization of collagen microparticles, which can be recovered by centrifugation or filtration and which can subsequently be subjected to crosslinking by the abovementioned methods.

According to one advantageous characteristic of the invention, the concentration of the collagen solution is between 0.1 and 2%, preferably about 0.5% (w/v).

In a second particular variant, the protein used is a collagen derivative, preferably atelocollagen.

According to one advantageous characteristic of the invention, the concentration of the atelocollagen solution is between 0.3 and 4% (w/v).

In a third particular variant, the polysaccharide used is a glycosaminoglycan well known to those skilled in the art. Glycosaminoglycans are described in particular in the Applicant's document EP-A-0318154 of the prior art. The polysaccharide used can also be chitosan. Chitosan is a polyionic polymer which is only soluble in the aqueous phase at pH values below 5. When the pH of a chitosan solution is brought to a value close to neutrality, the polymer precipitates to form perfectly water-insoluble fibrils. This property can be utilized for the production of microcapsules according to the invention. A chitosan solution is prepared at acid pH, an emulsion is produced in a hydrophobic liquid and the pH of the disperse phase is modified by the addition of an alcoholic solution of a base to the emulsion. Precipitation in situ permits the formation of readily recoverable microparticles, which can subsequently be chemically crosslinked if necessary.

According to one advantageous characteristic of the invention, it is preferable to use a highly deacetylated chitosan whose molecular weight is very high, preferably greater than 300,000 daltons. "Highly deacetylated" is preferably understood as meaning a residual degree of acetylation of less than about 5%, preferably 3.5%. Such highly deacetylated chitosans are commercially available.

According to one advantageous characteristic of the invention, the concentration of the chitosan solution is between 0.2 and 10%, preferably about 1% (w/v).

According to a second feature of the formation of spheres by varying the pH of the disperse phase of an emulsion, microcapsules are formed, once the emulsion has been produced, by the initiation of a chemical reaction between the reactive groups of a substance or mixture of substances.

The chemical reaction can be for example a transacylation reaction which takes place at alkaline pH between a polysaccharide carrying esterified carboxyl groups and either a polyamino substance, for example a protein, or a polyhydroxylic substance, for example a polysaccharide.

In this case, the process for the manufacture of the microparticles is advantageously as follows:

a) a neutral, i.e. unreactive, aqueous solution is prepared which contains on the one hand a polysaccharide carrying esterified carboxyl groups and on the other hand either a polyamino substance, for example a protein, or a polyhydroxylic substance, for example a polysaccharide;

b) a hydrophobic liquid is provided in which the esterified polysaccharide and the polyamino or polyhydroxylic substance are essentially insoluble;

c) the hydrophobic liquid and the aqueous solution are mixed to form an emulsion;

d) a solution of an alkaline substance in an organic liquid miscible with the aqueous phase is added to the emulsion, making it possible to obtain physicochemical conditions favorable to the reaction between the polyamino substance or the polyhydroxylic substance and the polysaccharide carrying esterified carboxyl groups; and e) after a predetermined period of time required to effect a transacylation reaction, thereby forming microparticles, in particular microcapsules, the emulsion is neutralized, preferably by the addition, to the emulsion, of a solution of an acid substance in an organic liquid miscible with the aqueous phase, which neutralizes and stabilizes the microparticles formed, in particular the microcapsules formed.

In one variant, the emulsion formed is an emulsion of the aqueous solution as the disperse phase in the hydrophobic liquid as the continuous phase.

In a second mode of utilizing the invention, the modification of chemical composition induced in situ after production of the emulsion is a modification of the concentration of certain electrolytes.

A number of polysaccharides associate specifically with ions or polyions to form gels.

In particular, a number of polyanionic polysaccharides associate specifically with cations or polycations, more particularly with monovalent cations such as potassium and sodium, or divalent cations such as calcium, magnesium, strontium or barium. This association results in the formation of gels of greater or lesser susceptibility to breaking, according to the nature of the polysaccharide and the cation and to the concentrations used.

In one particular variant, a mixture of polysaccharides will be produced so that the cohesion of the gel formed can be modulated.

Kappa- and iota-carrageenans, pectins with a low degree of methylation, alginates and gellan gum are chosen as the polysaccharides which are preferably used.

In one variant, the polysaccharide is gellan gum, which is a polyanionic polysaccharide of very high molecular weight (at least 500,000 daltons), manufactured by microorganisms. When solubilized in water, gellan gives a low-viscosity solution with which it is possible to produce an emulsion by dispersion in a hydrophobic phase. When such an emulsion is heated to a temperature above 75° C. and cations are added by a process according to the invention, the droplets of the disperse phase undergo gelling. After returning to room temperature, the spheres formed in this way can be recovered and then chemically crosslinked if necessary.

According to one advantageous characteristic of the process according to the invention, the concentration of the gellan solution is between 0.1 and 5% and preferably about 0.6% (w/v).

According to another characteristic of the manufacturing process, an ethanolic solution is produced which contains calcium, magnesium, sodium or potassium ions so that the solution is brought to an ion concentration of between 1 and 400 mM, preferably of between 5 and 10 mM for calcium and magnesium ions and preferably of between 150 and 250 mM for sodium and potassium ions.

In another variant, the polysaccharide used is a kappa-carrageenan or an iota-carrageenan, which gels in the presence of potassium or calcium ions respectively.

According to one advantageous characteristic of the process according to the invention, the carrageenan is dissolved in the cold, at neutral or alkaline pH, in concentrations of between 0.1 and 5% (w/v), preferably about 1.5%. The temperature is raised to around 80° C. and an emulsion is then produced by dispersion in a hydrophobic liquid. Gelling of the droplets is then caused by the addition of an alcoholic solution containing potassium or calcium ions, according to whether the aqueous solution contains kappa- or iota-carrageenan.

In a third variant, the polysaccharide used is a pectin with a low degree of methylation, which forms solutions gellable in the presence of calcium ions.

According to one advantageous characteristic, a pectin solution with a concentration of between 0.1 and 10%, preferably of the order of 1 to 2% (w/v), is produced in the cold at neutral pH. An emulsion is produced by dispersion in a hydrophobic liquid. According to the invention, calcium ions are then added in the form of an alcoholic solution of calcium chloride.

In a last variant, the same type of process is carried out starting from a solution containing from 1 to 5% (w/v) of sodium alginate.

Finally, according to yet another feature, the present invention further relates to a composition such as a cosmetic composition or a pharmaceutical composition, or a food composition, characterized in that it comprises microparticles, in particular microcapsules, obtained by the abovementioned process.

Other objects, characteristics and advantages of the invention will become clearly apparent from the following explanatory description referring to several Examples of the invention, which are given simply by way of illustration and cannot therefore in any way limit the scope of the invention. The percentages are given by weight in the Examples, unless indicated otherwise.

EXAMPLE 1 OF THE INVENTION

Manufacture of microparticles of atelocollagen
a) Preparation of the aqueous phase A 2% (w/v) solution of bovine atelocollagen is prepared, the pH of which is adjusted to 4.
b) Emulsification 40 ml of this aqueous phase are emulsified, by mechanical agitation for a few minutes, in 250 ml of 2-ethylhexyl cocoate containing 2% v/v of Span 85® as the continuous phase.
c) Alkalization Twice 10 ml of 2% (w/v) sodium hydroxide in 95% ethanol are added 10 min apart. The reaction is allowed to proceed for 10 min after each addition.

d) Washes

The microparticles in the form of spheres are collected by centrifugation and then washed in several baths of 95% ethanol.
e) Crosslinking The spheres are crosslinked by incubation for 24 h at 4° C. in a bath of dimethylformamide containing 0.5% (v/v) of diphenylphosphoryl azide, and then for 4 h at room temperature in borate buffer of pH 8.9 (sodium tetraborate 0.04M, boric acid 0.04M).

After washes with water, the microparticles thus obtained can be lyophilized.

EXAMPLE 2 OF THE INVENTION

Manufacture of microparticles of chitosan
a) Preparation of the aqueous phase

A 1% (w/v) solution of highly deacetylated HMW chitosan (Abet Technologies) in 1.25% acetic acid, pH 4, is prepared.
b) Emulsification An emulsion is produced by dispersion of 50 ml of this solution in 250 ml of isopropyl myristate containing 2% (v/v) of Span 85®. The emulsion is agitated mechanically for 10 min.
c) Alkalization 16 ml of 2% w/v sodium hydroxide in 95% ethanol are added and agitation is continued for 15 min.
d) Washes The microparticles are recovered by centrifugation and washed in several baths of ethanol and then water.
e) Crosslinking The microparticles can be crosslinked as described in Example 1.

EXAMPLE 3 ACCORDING TO THE INVENTION

Manufacture of microparticles of mean diameter 150 μm from human serum albumin (HSA) and propylene glycol alginate (PGA)
a) preparation of the aqueous phase A solution in distilled water containing 20% of HSA (Centre de Transfusion Sanguine, Strasbourg) and 1% of a PGA having a degree of esterification of between 80 and 85% (Kelcoloïd S®, KELCO International) is prepared by magnetic agitation for 10 min at room temperature.
b) Emulsification 6 ml of this aqueous phase, used as the disperse phase, are emulsified, by mechanical agitation for 5 min at 2000 rpm, in 40 ml of isopropyl myristate containing 2% v/v of Span 85® as the continuous phase.
c) Alkalization 2 ml of a 2% w/v solution of sodium hydroxide in 95% ethanol are added to the emulsion, with agitation, and the transacylation reaction is allowed to proceed for 15 min to produce microparticles.
d) Acidification 2 ml of a 7.6% v/v solution of acetic acid in 95% ethanol are added to the reaction medium, with agitation. Agitation is maintained for a further 15 min to permit the neutralization of the microparticles formed.
e) Washes The microparticles are separated off by centrifugation and subsequently washed by resuspension in 95% ethanol containing 2% of Tween 20®, then in 95% ethanol and then in distilled water.

The microparticles can then be frozen and lyophilized.

This gives transparent spheres with a mean size of 150 μm. After lyophilization, rehydration of the powder obtained shows that the microparticles are intact and resume their spherical shape.

Stability tests in various media containing or not containing proteases

In test tubes, 25 mg samples of lyophilized microparticles are rehydrated by the addition of 1 ml of distilled water, after which 7.5 ml of the following different media are added:

- distilled water
- a solution of acid pH (1.2) to which pepsin (artificial gastric medium, USP XXI) may or may not have been added
- a solution of slightly alkaline pH (7.5) to which trypsin (0.25% w/v) may or may not have been added.

The tubes are incubated at 37° C. The stability of the microparticles is studied by microscopic examination. The lysis time is the time after which all the microparticles have disappeared from the medium.

Results

The microparticles prepared according to this Example are stable for more than 3 d in distilled water and in the solutions of pH 1.2 or pH 7.5. They are degraded by proteases: in 15 min by pepsin and in 25 min by trypsin.

EXAMPLE 4 OF THE INVENTION

Manufacture of microparticles from gelatin and PGA

Preparation of the aqueous phase 8 ml of an aqueous solution of type B gelatin, bloom 150, at a concentration of 10% and PGA at a concentration of 1% are prepared at a temperature of 40° C.

Emulsification

In a thermostated vessel at 40° C., 6 ml of this aqueous phase are emulsified in 40 ml of isopropyl myristate containing 2% of Span 85 and preheated to a temperature of 40° C. (agitation speed: 2000 rpm).

Alkalization

Neutralization and washes are then effected as described in Example 3. The microparticles appear as spheres of mean diameter 1 mm. After lyophilization, they give a white powder which is readily rehydratable.

EXAMPLE 5 OF THE INVENTION

Manufacture of microparticles from atelocollagen, chondroitin sulfate and PGA

Preparation of the aqueous phase

PGA is added at a concentration of 0.7% to a solution containing 1.6% of atelocollagen and 0.6% of chondroitin sulfate in a phosphate buffer of pH 7.4. The protocol described in Example 3 is then applied to this aqueous solution.

Microparticles of mean diameter 600 μm are obtained.

EXAMPLE 6 OF THE INVENTION

Manufacture of microparticles from a whey protein concentrate and PGA

Preparation of the aqueous phase 160 mg of PGA and 3.2 g of whey protein concentrate (Prosobel S65E®, Bel Industries) are dissolved in 16 ml of distilled water.

The protocol described in Example 3 is then repeated using 12 ml of the above solution as the aqueous phase and doubling all the volumes of the various reagents.

This gives spherical microparticles of mean diameter 500 μm and of granular content, which are intact after lyophilization.

EXAMPLE 7 OF THE INVENTION

Manufacture of microparticles from ovalbumin and pectin

Preparation of the aqueous phase 240 mg of apple pectin (FLUKA, esterification: 70 to 75%) and 800 mg of ovalbumin are dissolved in 8 ml of distilled water.

The protocol described in Example 3 is then applied using 6 ml of the above solution, replacing the isopropyl myristate with fluid paraffin oil and doubling the volumes of the alkaline and acid solutions.

This gives microparticles of mean size 200 μm and of granular content.

EXAMPLE 8 OF THE INVENTION

Manufacture of microparticles from carboxymethyl cellulose (CMC) and PGA

Preparation of the aqueous phase: 80 mg of CMC (CMC 7 LF, degree of substitution: 0.7, HERCULES) and 320 mg of PGA are dissolved in 8 ml of distilled water by magnetic agitation for 15 min at 40° C.

The protocol described in Example 3 is then applied using 6 ml of the above solution.

This gives granular microparticles of mean size 1.8 mm.

EXAMPLE 9 OF THE INVENTION

Manufacture of microparticles of atelocollagen a) Preparation of the aqueous phase A 2% (w/v) solution of bovine atelocollagen is prepared, the pH of which is adjusted to 3.7 in the manner well known to those skilled in the art, especially from the Applicant's previous documents such as EP-A-0318154, to which those skilled in the art may refer.

b) Emulsification 50 ml of this phase are emulsified, by mechanical agitation for a few minutes, in 200 ml of 2-ethylhexyl cocoate as the continuous phase.

c) Addition of the non-solvent 400 ml of 95° ethyl alcohol are added with continued agitation. The agitation is stopped after a few seconds, causing microparticles to precipitate.

d) Washing

The microparticles obtained are collected by filtration and then washed in several baths of 95° ethanol.

e) Crosslinking

The microparticles are preferably crosslinked by incubation for 24 h at 4° C. in a bath of dimethylformamide containing 0.5% (v/v) of diphenylphosphoryl azide and then for 4 h at room temperature in borate buffer of pH 8.9.

After washing with water, the resulting microparticles can be lyophilized.

EXAMPLE 10 OF THE INVENTION

Manufacture of microparticles of atelocollagen

In this Example, the procedure described in Example 9 is followed except that the ethyl alcohol is replaced with acetone as the non-solvent for precipitating the microparticles.

After the microparticles have been washed several times in several baths of acetone, the crosslinking can be carried out as described in Example 9.

After washing with water, the microparticles can also be lyophilized.

The invention covers any means which constitute technical equivalents of the means described, as well as the various combinations thereof. The invention also covers any characteristic which appears novel compared with any state of the art, on the basis of the description taken as a whole, i.e. including the claims.

What is claimed is:

1. A process for the manufacture of microparticles comprising:
   a) preparing an essentially homogenous solution of a substance or mixture of substances in a first solvent,
   b) producing an emulsion of this homogenous solution in a dispersing liquid forming a continuous phase, in which said substance or said mixture of substances is essentially insoluble, and forming a disperse phase,
   c) initiating a chemical or physicochemical reaction in the disperse phase by modification of the in situ chemical composition of said substance or said mixture or substances in the disperse phase by adding thereto an agent which is essentially insoluble in or immiscible with the continuous phase, under the conditions of addition, thereby modifying the physicochemical state of said disperse phase resulting in the insolubilization of the substance or mixture of substances in the disperse phase and the individualization of said microparticles, in the presence of the first solvent.

2. The process of claim 1, wherein the agent which is essentially insoluble in or immiscible with the continuous phase, under the conditions of addition, which is added to the disperse phase is added as a solution in a second solvent which is miscible with the first solvent of the disperse phase and which has a lower affinity for the dispersing liquid of the continuous phase than for the disperse phase.

3. The process of claim 1, wherein said substance or mixture of substances is selected from the group consisting of nucleic acids, a protein, a polysaccharide, and any mixture thereof.

4. The process of claim 1, wherein a chemical reaction is initiated comprising the formation of covalent bonds.

5. The process of claim 1, wherein said chemical reaction providing the formation of covalent bonds is selected from the group consisting of an esterification and an amidation.

6. The process of claim 1, wherein said chemical reaction comprises the formation of ionic bonds between the ionizable groups of said substance comprising ionizable groups.

7. The process of claim 6, wherein said chemical reaction comprising ionizable groups is selected from the group consisting of nucleic acids, a protein, a polysaccharide and any mixture thereof.

8. The process of claim 1, wherein a physicochemical reaction is initiated selected from the group consisting of a coacervation reaction, and a precipitation reaction.

9. The process of claim 1, wherein said agent which is essentially insoluble in or immiscible with the continuous phase causes a physicochemical reaction selected from the group consisting of a phase separation within the initially homogenous solution of the disperse phase, the gelling of said solution of the disperse phase and a loss of solubility of the disperse phase by condensation or polymerization of said substance.

10. The process of claim 1, wherein said agent which is essentially insoluble in or immiscible with the continuous phase, under the conditions of addition, is a non-solvent for the substance or mixture of substances solubilized in the first solvent of the disperse phase.

11. The process of claim 1, wherein said agent which is essentially insoluble in or immiscible with the continuous phase, under the conditions of addition, causes a pH modification of the disperse phase.

12. The process of claim 1, wherein said agent which is essentially insoluble in or immiscible with the continuous phase, under the conditions of addition, comprises at least one electrolyte.

13. The process of claim 1, wherein said agent which is essentially insoluble in or immiscible with the continuous phase, under the conditions of addition, comprises at least one molecule capable of reacting with the substance or substances dissolved in the disperse phase of the emulsion.

14. The process of claim 10, wherein the non-solvent for the substance or mixture of substances solubilized in the solvent of the disperse phase causes insolubilization of the substance or mixture of substances of the disperse phase.

15. The process of claim 14, wherein said insolubilization is selected from the group consisting of a gelling and a coagulation.

16. The process of claim 14, wherein said non-solvent is selected from the group consisting of an alcohol and a ketone.

17. The process of claim 16, wherein said alcohol is a $C_1$-$C_6$ lower alcohol and said ketone is a $C_2$-$C_6$ lower ketone.

18. The process of claim 17, wherein said alcohol is ethanol and said ketone is acetone.

19. The process of claim 1, which is a process for the manufacture of microcapsules.

20. A process for the manufacture of microparticles, comprising:
   a) preparing an aqueous solution of a substance selected from the group consisting of nucleic acids, a protein, a polysaccharide and any mixture thereof;
   b) providing a hydrophobic liquid in which said substance or substances are essentially insoluble;
   c) mixing the hydrophobic liquid and the aqueous solution to form an emulsion in which the aqueous solution is a disperse phase and the hydrophobic liquid is a continuous phase;
   d) adding to the emulsion a non-solvent for the substance solubilized in the disperse phase in determined proportions for having said non-solvent essentially immiscible with the continuous phase and for forming microparticles from the disperse phase by insolubilization of said substance or substances in the disperse phase, and
   e) recovering said microparticles by physical separation.

21. The process of claim 20, wherein said insolubilization is selected from the group consisting of a gelling and a coagulation.

22. The process of claim 20, wherein said physical separation is selected from the group consisting of a filtration, a centrifugation and a decantation.

23. The process of claim 20, further comprising crosslinking the microparticles with a crosslinking agent.

24. The process of claim 20, wherein said insolubilization comprises adding said insoluble or immiscible agent comprising a pH-modifying substance dissolved in an organic solvent miscible with the disperse phase.

25. The process of claim 24, wherein the pH-modifying substance is selected from the group consisting of an acid, a base and a buffer, depending on the required pH value.

26. The process of claim 20, for the preparation of microcapsules.

27. A process for the manufacture of microparticles, comprising:
   a) preparing an aqueous solution of a substance selected from the group consisting of nucleic acids, a protein, a polysaccharide and any mixture thereof, said aqueous solution having a pH adapted for forming an essentially homogeneous solution of said substance or mixture of substances with a viscosity compatible with the production of an emulsion;

b) providing a hydrophobic liquid in which the substance or mixture of substances are essentially insoluble;

c) mixing the hydrophobic liquid and the aqueous solution to form an emulsion in which the aqueous solution is a disperse phase and the hydrophobic liquid is a continuous phase;

d) adding to the emulsion a solution of a substance selected from the group consisting of an alkaline substance and an acid substance, in an organic liquid miscible wit the aqueous phase, thereby insolubilizing said substance or substances resulting in formation of microparticles from said disperse phase; and e) recovering said microparticles.

28. The process of claim 27, further comprising crosslinking said microparticles with a crosslinking agent.

29. The process of claim 28, wherein said crosslinking agent is a bifunctional crosslinking agent capable of reacting with said substance or substances, comprising carboxylic groups, amine groups and hydroxyl groups, and an agent capable of activating the carboxylic groups of said substance or substances to form covalent bonds selected from the group consisting of amide bonds with amine groups, and ester bonds with hydroxyl groups of said substance or substances.

30. The process of claim 29, wherein said bifunctional crosslinking agent is selected from the group consisting of formaldehyde, glutaraldehyde, di-aldehydes, acid dichlorides, di-acids anhydrides, di-isocyanates, di-imidoesters, bis-chloroformates and succinimides, and said agent activating carboxyl groups is selected from the group consisting of a carbodiimide and an azide.

31. The process of claim 1, wherein the substance is a protein selected from the group consisting of collagen and atelocollagen, and said polysaccharide is selected from the group consisting of glycosaminoglycan and chitosan.

32. The process of claim 20, wherein the protein is selected from the group consisting of collagen, atelocollagen, said polysaccharide is selected from the group consisting of gllycosaminoglycan and chitosan.

33. The process of claim 27, wherein the protein is selected from the group consisting of collagen, atelocollagen, said polysaccharide is selected from the group consisting of glycosaminoglycan and chitosan.

34. The process of claim 27 comprising:

a) preparing a neutral, unreactive aqueous solution containing a polysaccharide carrying esterified carboxyl groups and a substance selected from the group consisting of a polyamino substance, and a polyhydroxylic substance;

b) providing a hydrophobic liquid in which the esterified polysaccharide and said substance are essentially insoluble;

c) mixing the hydrophobic liquid and the aqueous solution to form an emulsion constituting a disperse phase;

d) adding to the emulsion a solution of an alkaline substance in an organic liquid miscible with the aqueous phase thereby initiating a transacylation reaction in said disperse phase between the polysaccharide carrying esterified carboxyl groups and said substance; and e) neutralizing said emulsion by adding to the emulsion of a solution of an acid substance in an organic liquid miscible with the aqueous phase, thereby stabilizing microparticles formed thereby.

35. The process of claim 34, comprising manufacturing microcapsules.

36. The process of claim 35, wherein said substance is a polysaccharide which is capable of associating specifically with an ion entity to form a gel.

37. The process of claim 36, wherein said polysaccharide is selected from the group consisting of kappa-carrageenan, iota-carrageenan, a pectin with a low degree of methylation, an alginate and a gellan gum having a high molecular with of a least 500,000 daltons.

38. The process of claim 37, wherein gellan is used in an aqueous solution at a concentration of between 0.1 and 5% weight/volume.

39. The process of claim 38, wherein gellan is used in a aqueous solution at a concentration of about 0.6% weight/volume.

40. The process of claim 39, wherein said ionic entity is present as an ethanolic solution having an ion concentration ranging between 1 and 400 mM.

41. The process of claim 40, wherein said ionic entity is selected from the group consisting of calcium, magnesium, sodium and potassium.

42. The process of claim 36, wherein said polysaccharide is selected from the group consisting of kappa-carrageenan and iota-carrageenan which is gellable by an ionic entity selected from the group consisting of potassium ions and calcium ions; said process comprising solving the carrageenan in the cold in an aqueous solution initially brought at a pH selected from the group consisting of a neutral pH and an alkaline pH, at a concentration ranging between 0.1 and 5% in weight/volume, raising the temperature to about 80° C., producing an emulsion by dispersion of said carrageenan aqueous solution in a hydrophobic liquid comprising droplets of said carrageenan aqueous solution dispersed in said hydrophobic liquid; and gelling said droplets by adding to the emulsion an alcoholic solution containing said ionic entity, thereby manufacturing said microparticles by gelling said carrageenan.

43. The process of claim 36, wherein said polysaccharide is a pectin with a low degree of methylation which is gellable in the presence of calcium ions, said process comprising preparing a pectin solution at a concentration ranging between 0.1 and 10% weight/volume in the cold at a substantially neutral pH, producing an emulsion of said pectin solution by dispersion in a hydrophobic liquid to provide droplets of said pectin solution in said hydrophobic liquid, and gelling said droplets by adding an alcoholic solution containing calcium ions, thereby manufacturing pectin based microparticles.

44. The process of claim 36, wherein the polysaccharide is a 1 to 5% weight/volume solution of sodium alginate.

45. Microparticles made from a substance or mixture of substances which has been first solubilized in a first solvent dispersed in a dispersion liquid to form an emulsion before being insolubilized to form said microparticles.

46. Microparticles according to claim 45, made from said substance or mixture of substances comprising carboxylic groups, and at least one of amine groups and alcohol groups, which are crosslinked due to activation of the carboxylic groups by an activating agent which does not form a bridge, thereby forming an amide bond between a carboxylic group and an amino group or an ester bond between a carboxylic group and an alcohol group.

47. Microparticles according to claim 46 which comprise a reaction product between a polysaccharide bearing esterified carboxylic groups and at least one said substance selected from the group consisting of a polyamine substance and a polyhydroxy substance.

48. Microparticles according to claim 45, wherein said microparticles have an inner filled space thereby constituting microcapsules and have a wall essentially constituted by a reaction product between a polysaccharide bearing esterified carboxylic groups and at least one said substance selected from the group consisting of a polyamine substance and a polyhydroxy substance.

49. Microparticles according to claim 45, wherein said substance or mixture of substances is selected from the group consisting of a protein, a polysaccharide, a nucleic acid, a mixture of proteins, a mixture of polysaccharides, a mixture of proteins and polysaccharides, a mixture of a protein with a nucleic acid, a mixture of polysaccharide with a nucleic acid and a mixture of protein, polysaccharide and nucleic acid.

50. Microparticles according to claim 45, wherein said substance of mixture of substances is a protein selected from the group consisting of alpha-lactalbumin, beta-lactoglobulin, a casein, ovalbumin, an animal albumin, a blood globulin, hemoglobin, fibrinogen, collagen, atelocollagen, gelatin, keratin, a vegetable albumin, a vegetable globulin, glutenin, gliadin, a protein extract derived from milk, silk, a protein extract derived from a cereal, a protein extract derived from a leguminous plant, a protein extract from an algae and a protein extract derived from fish.

51. Microparticles according to claim 45, wherein said substance or mixture of substances is a polysaccharide selected from the group consisting of agar, agarose, agaropectin, a carrageenan, an alginate, a pectin, amylose, amylopectin, starch, a modified starch, a galactomannan, a glucomannan, konjac, a modified cellulose, inulin, xanthan, dextran, curdlan, gellan, chitosan, a chondroitin sulfate, hyaluronic acid, dermatan sulfate, heparan sulfate, heparin and keratan sulfate.

52. Microparticles according to claim 45, wherein said substance or mixture of substances is selected from the group consisting of a gellable polysaccharide and a coagulatable polysaccharide which is gelled or coagulated.

53. Microparticles according to claim 45, wherein said substance or mixture of substances is a polysaccharide selected from the group consisting of carrageenan kappa, carrageenan iota, a pectin with a low degree of methylation, an alginate and gellan gum.

54. Microparticles according to claim 45, wherein said substance or mixture of substances is a propylen glycol alginate.

55. Microparticles according to claim 45, wherein said microparticles are lyophilized.

56. A composition selected from the group consisting of a cosmetic composition, a pharmaceutical composition and a food composition, said composition comprising microparticles as defined in claim 45.

57. A product produced by the process of claim 1.

58. A product produced by the process of claim 20.

59. A product produced by the process of claim 27.

60. A composition selected from the group consisting of a cosmetic composition, a pharmaceutical composition and a food composition comprising microparticles as obtained by the process of claim 1.

61. A composition selected from the group consisting of a cosmetic composition, a pharmaceutical composition and a food composition comprising microparticles as prepared by the process of claim 20.

62. A composition selected from the group consisting of a cosmetic composition, a pharmaceutical composition and a food composition comprising microparticles as prepared by the process of claim 27.

63. The process of claim 23, wherein said crosslinking agent is a bifunctional crosslinking agent capable of reacting with said substance or substances, comprising carboxylic groups, amine groups and hydroxyl groups, and an agent capable of activating the carboxylic groups of said substance or substances to form covalent bonds selected from the group consisting of amide bonds with amine groups, and ester bonds with hydroxyl groups of said substance or substances.

64. The process of claim 63, wherein said bifunctional crosslinking agent is selected from the group consisting of formaldehyde, glutaraldehyde, di-aldehydes, acid dichlorides, di-acid anhydrides, di-isocyanates, di-imidoesters, bis-chloroformates and succinimides, and said agent activating carboxyl groups is selected from the group consisting of a carbodiimide and an azide.

65. A process according to claim 27, further comprising lyophilizing the microparticles.

66. The process of claim 1, wherein the homogeneous solution comprises a mixture of human serum albumin and propylene glycol alginate.

67. The process of claim 1, wherein the homogeneous solution comprises a mixture of gelatin and propylene glycol alginate.

68. The process of claim 1, wherein the homogeneous solution comprises a mixture of atelocollagen, chondroitin sulfate and propylene glycol alginate.

69. A process of claim 1, wherein the homogeneous solution comprises whey protein and propylene glycol alginate.

70. A process according to claim 1, wherein the homogeneous solution comprises a mixture of ovalbumin and pectin.

71. A process according to claim 1, wherein the homogeneous solution comprises a mixture of carboxymethyl cellulose and propylene glycol alginate.

72. A process according to claim 1, wherein the substance comprises human serum albumin, gelatin, ovalbumin or carboxymethyl cellulose.

* * * * *